Figure 1:
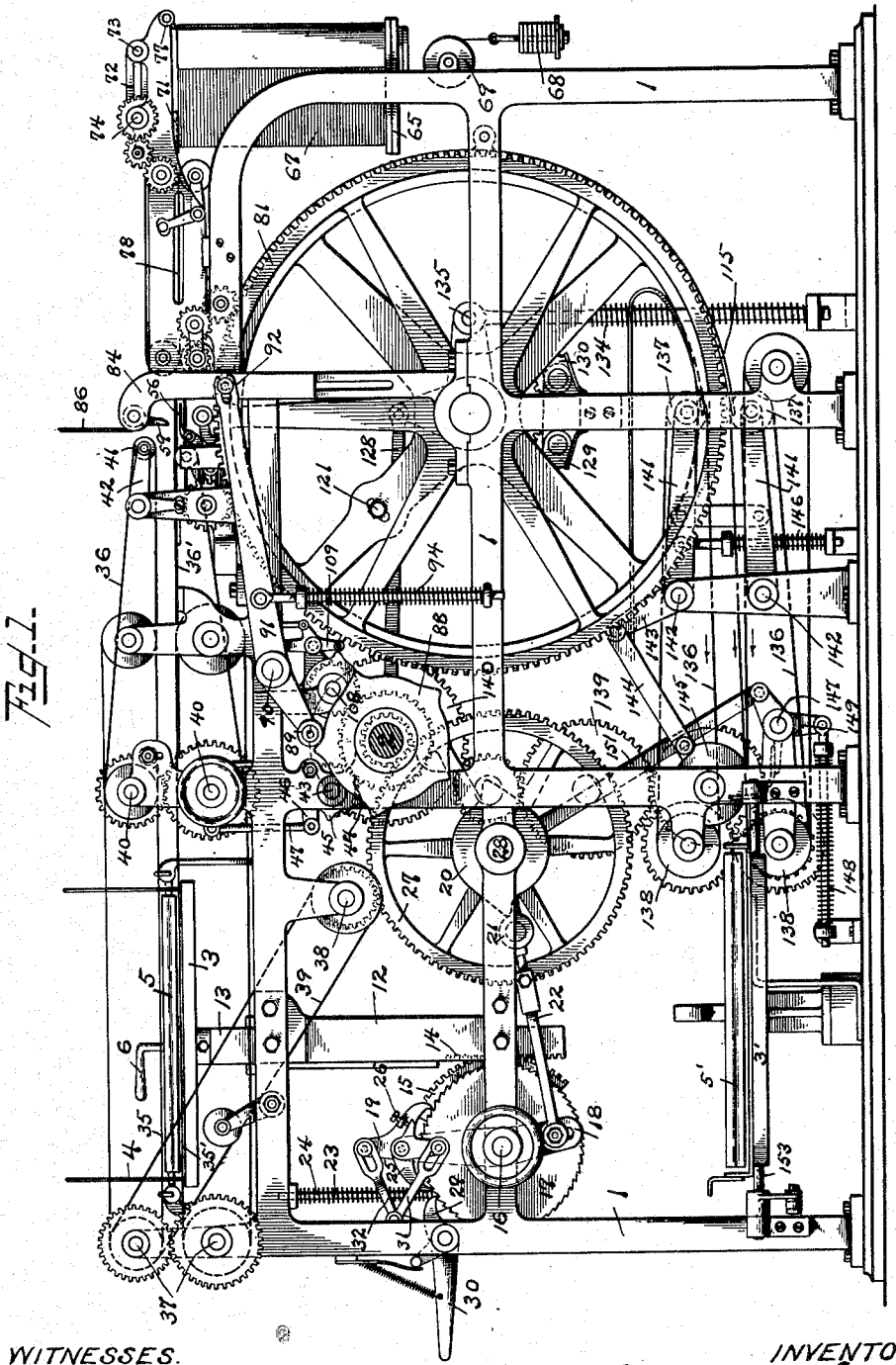

E. P. SHELDON.
MACHINE FOR BANDING CIGARS.
APPLICATION FILED JUNE 6, 1908.

981,017.

Patented Jan. 10, 1911.

13 SHEETS—SHEET 1.

WITNESSES.

INVENTOR.
Edward P. Sheldon
By Townsend & Decker
ATT'YS

E. P. SHELDON.
MACHINE FOR BANDING CIGARS.
APPLICATION FILED JUNE 6, 1908.

981,017.

Patented Jan. 10, 1911.
13 SHEETS—SHEET 3.

WITNESSES

INVENTOR
Edward P. Sheldon
BY
Townsend & Decker
ATTORNEYS

E. P. SHELDON.
MACHINE FOR BANDING CIGARS.
APPLICATION FILED JUNE 6, 1908.
981,017.
Patented Jan. 10, 1911.
13 SHEETS—SHEET 4.
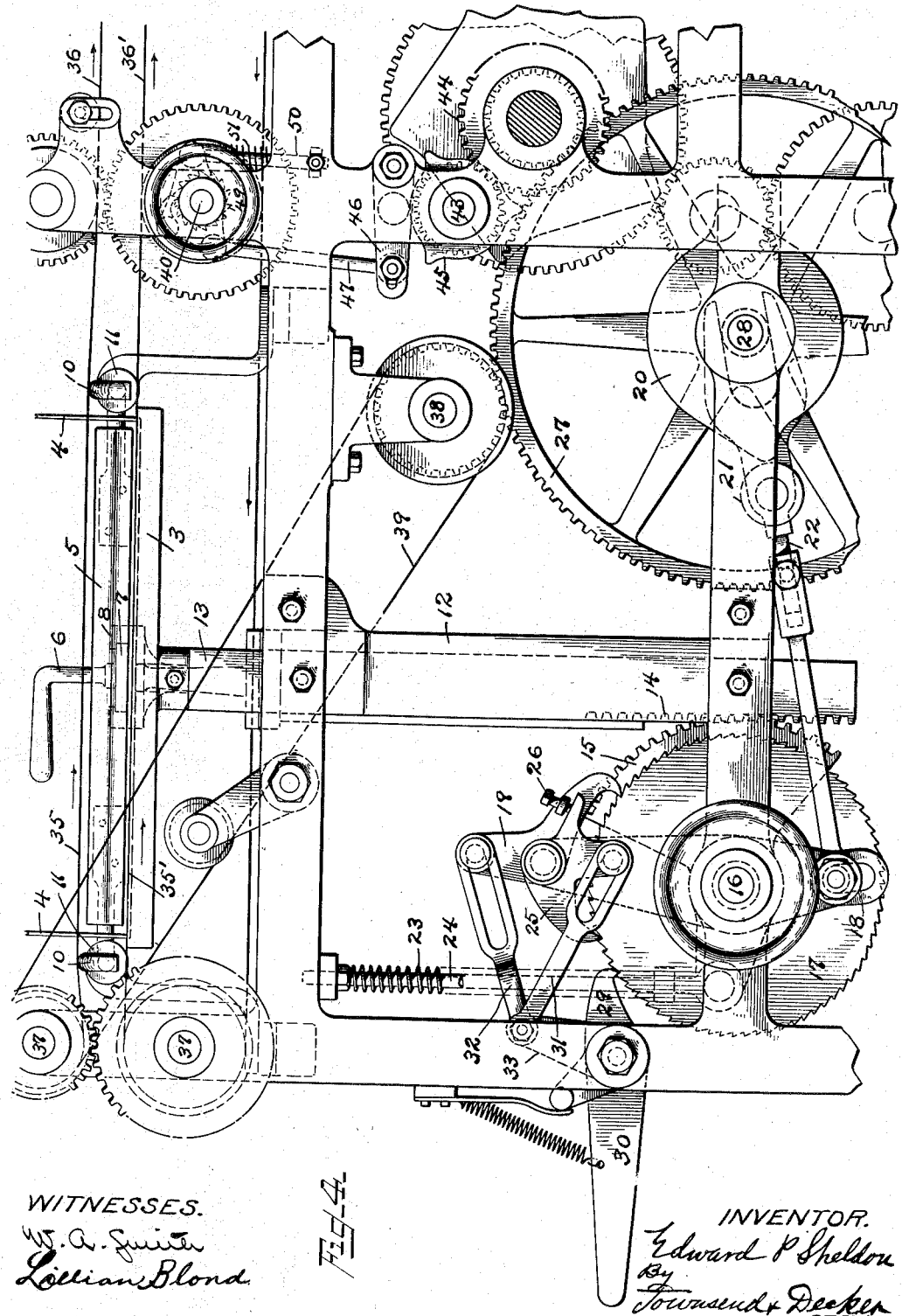
WITNESSES.
INVENTOR.
Edward P Sheldon
By
Townsend & Decker
ATTYS.

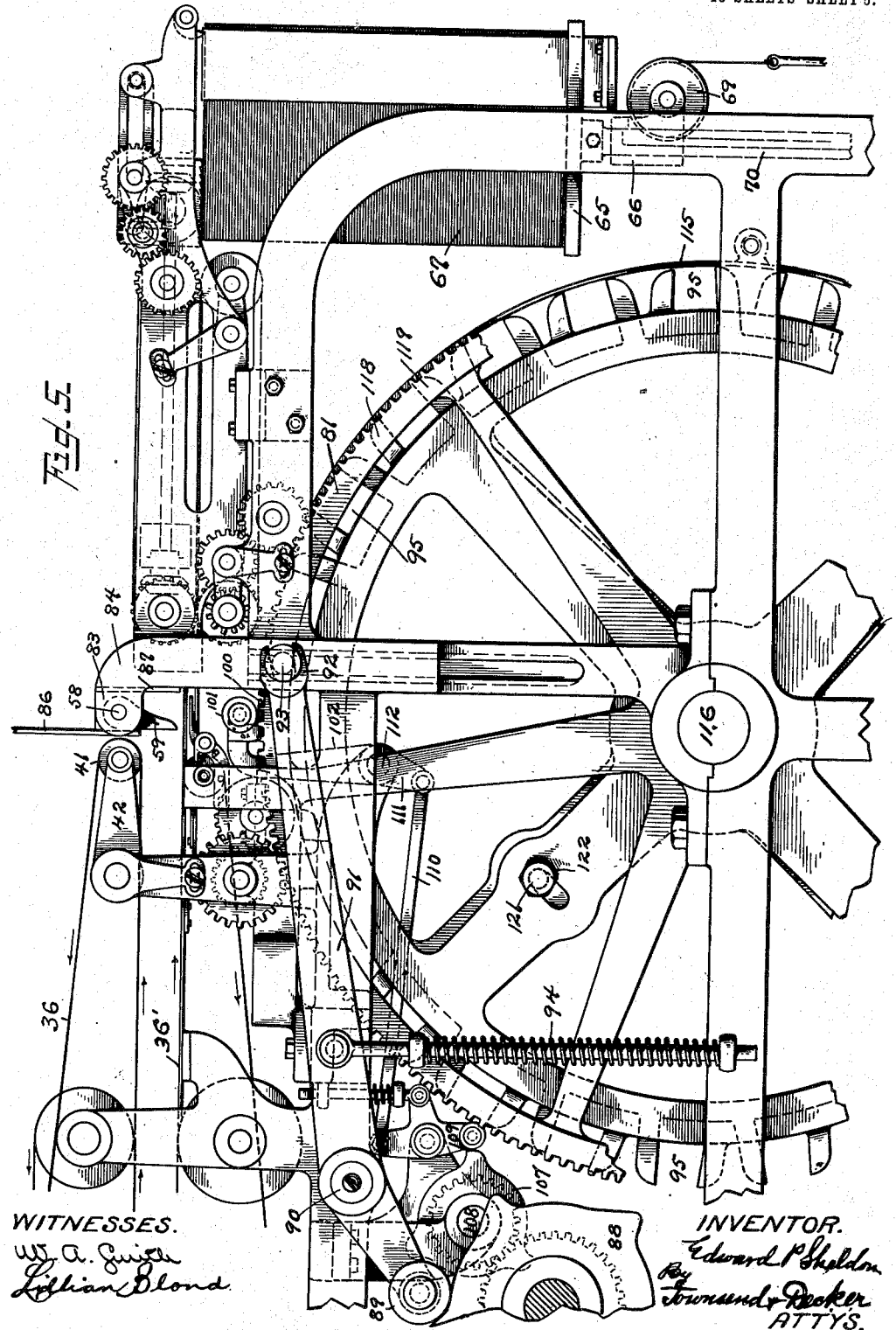

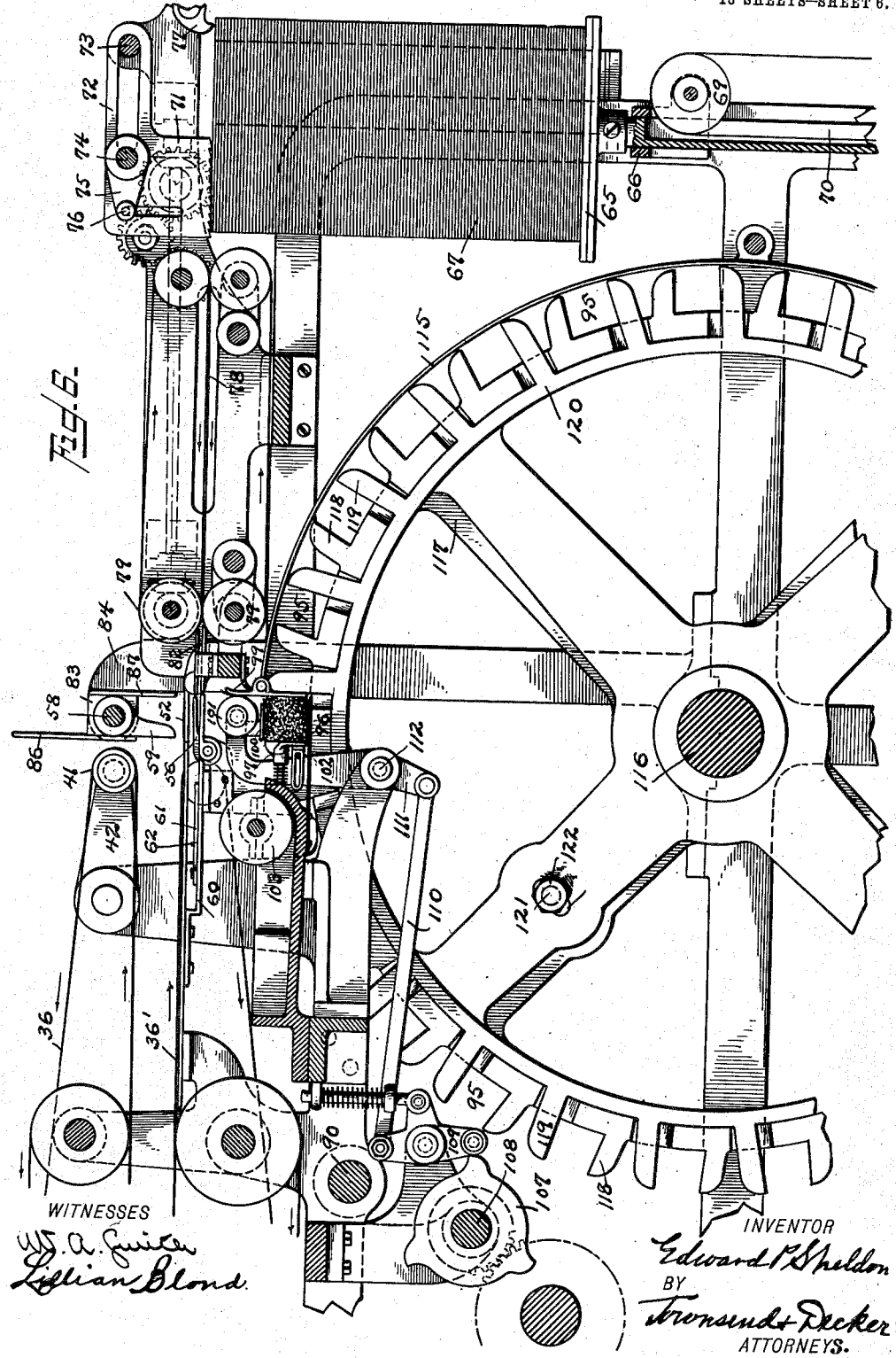

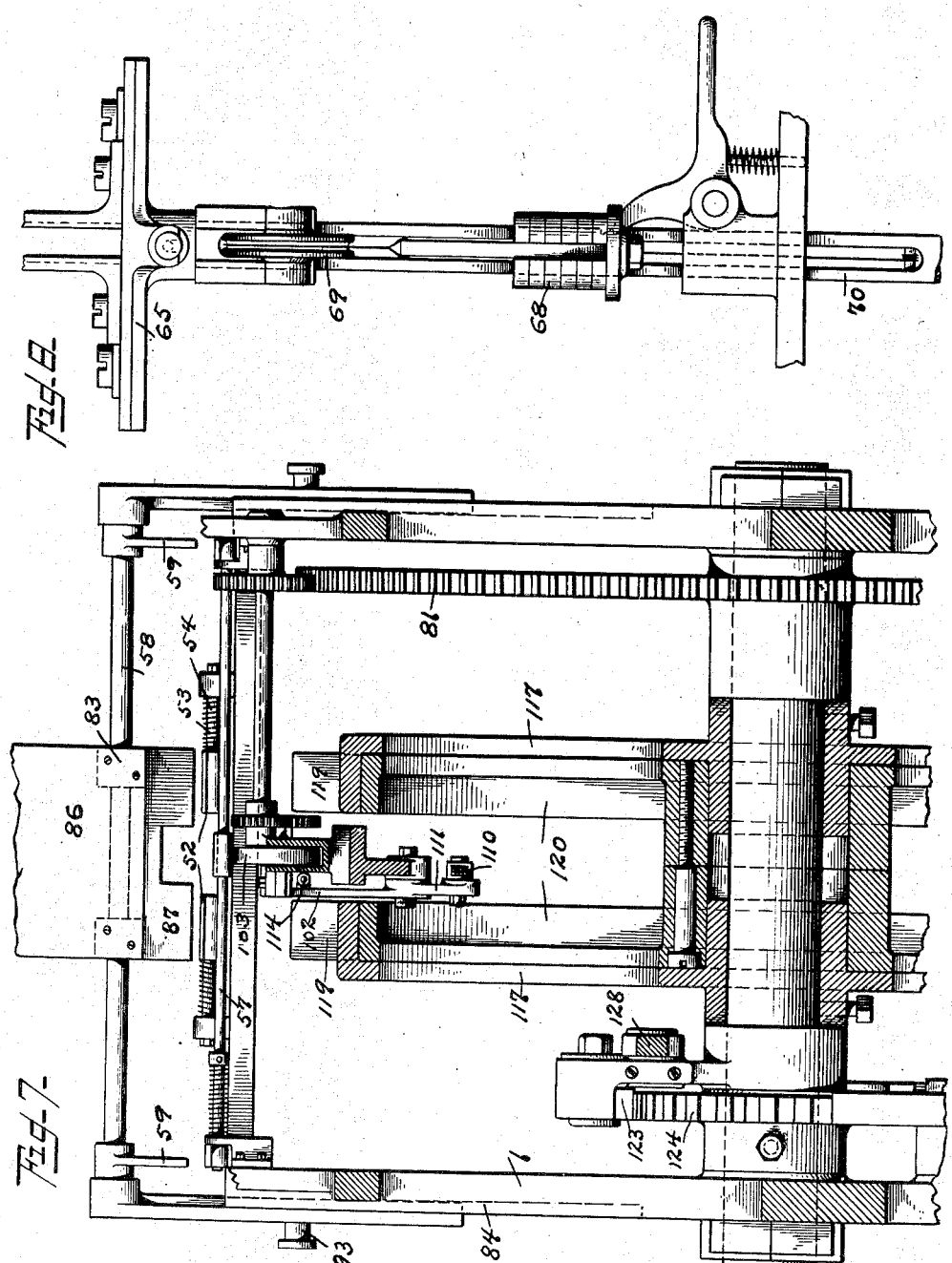

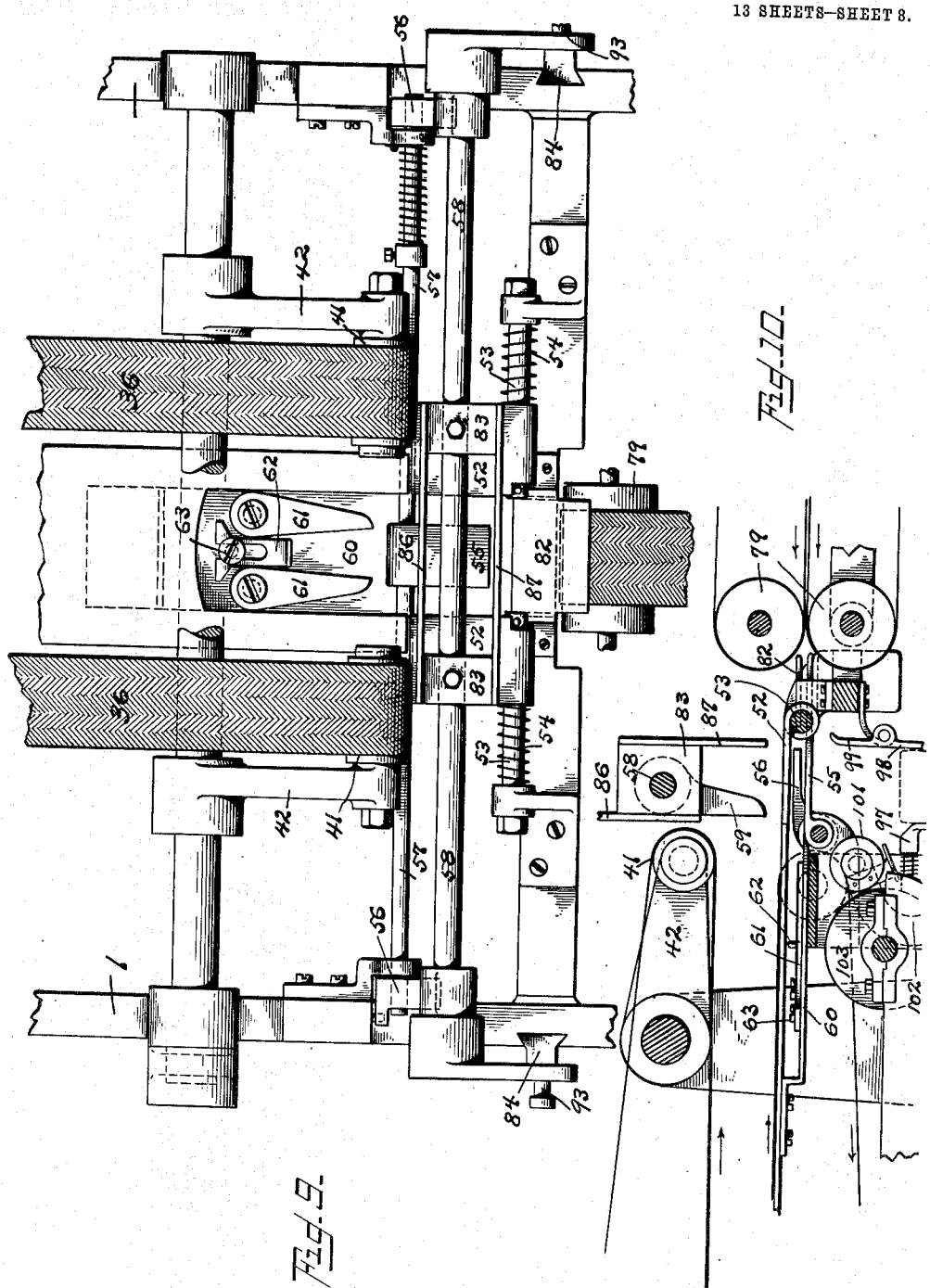

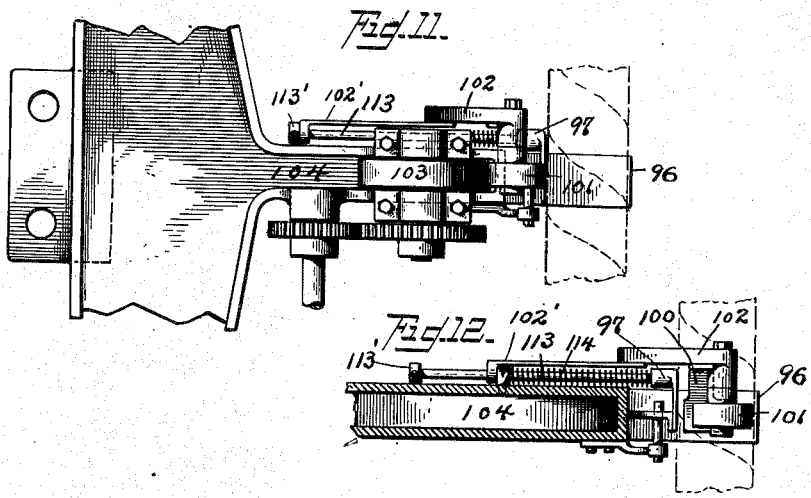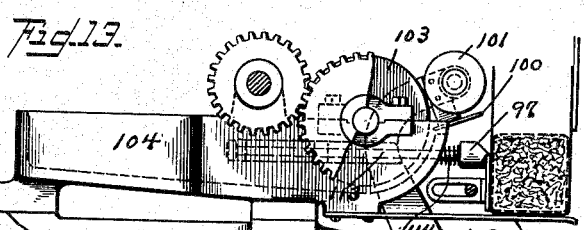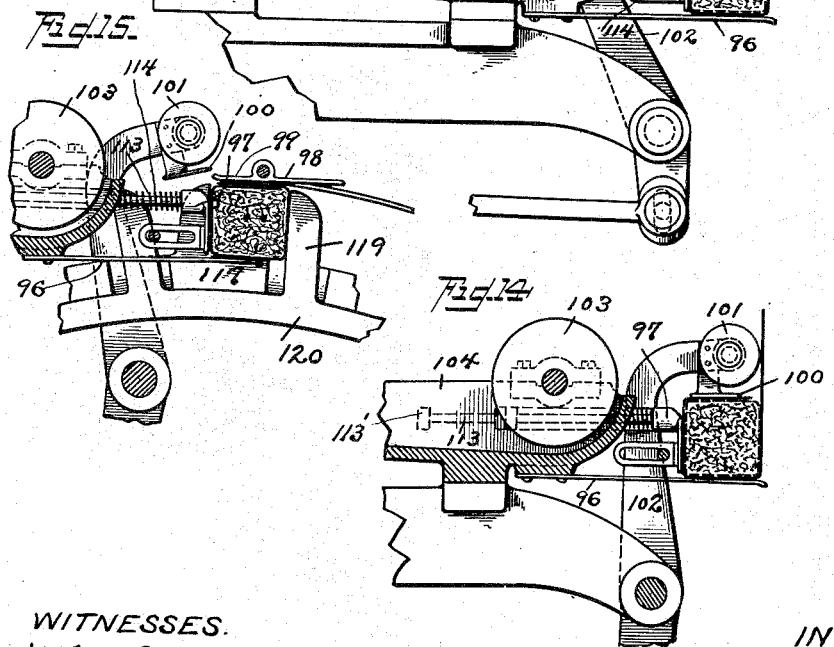

E. P. SHELDON.
MACHINE FOR BANDING CIGARS.
APPLICATION FILED JUNE 6, 1908.
981,017.
Patented Jan. 10, 1911.
13 SHEETS—SHEET 10.
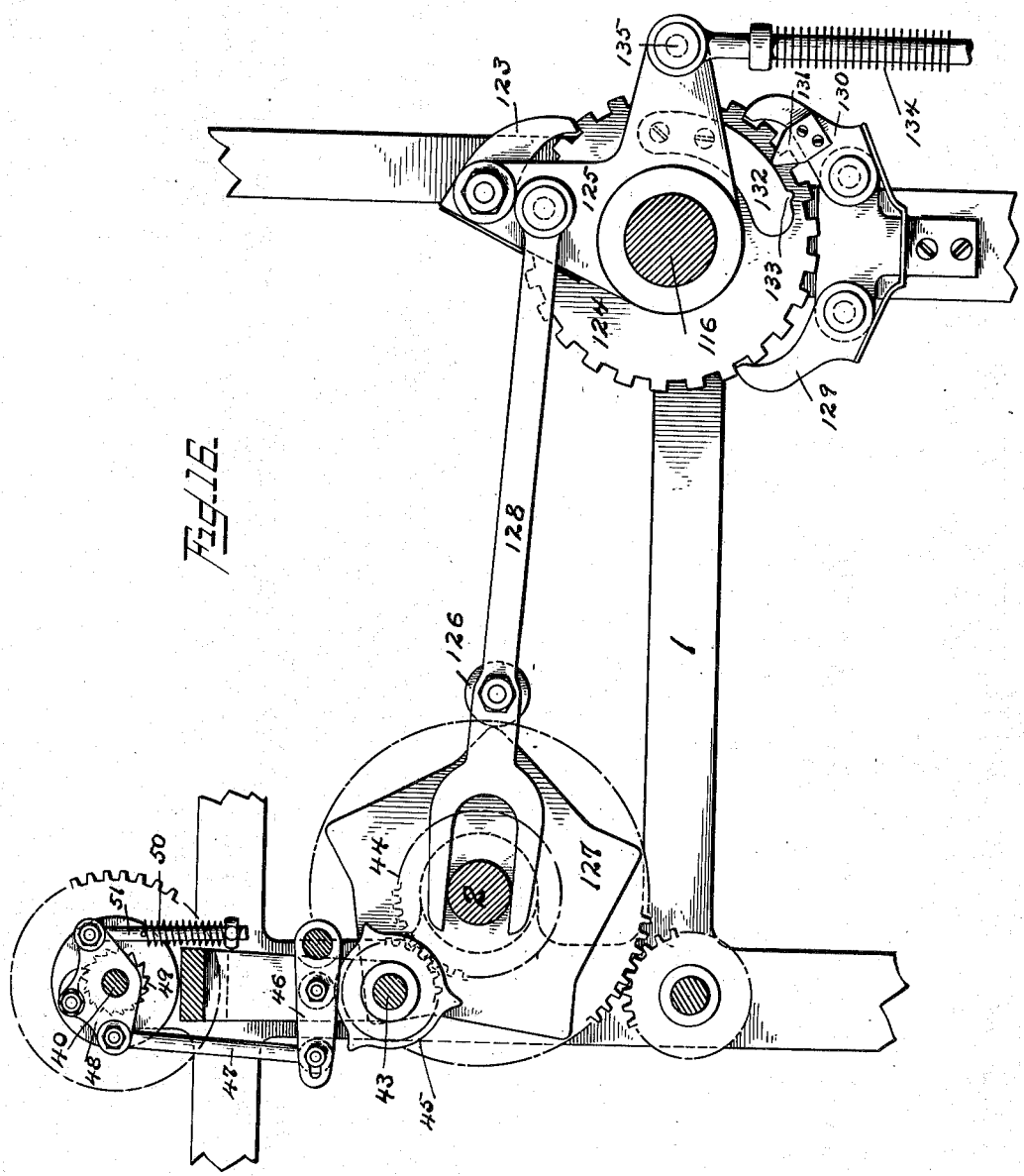

E. P. SHELDON.
MACHINE FOR BANDING CIGARS.
APPLICATION FILED JUNE 6, 1908.
981,017.
Patented Jan. 10, 1911.
13 SHEETS—SHEET 11.
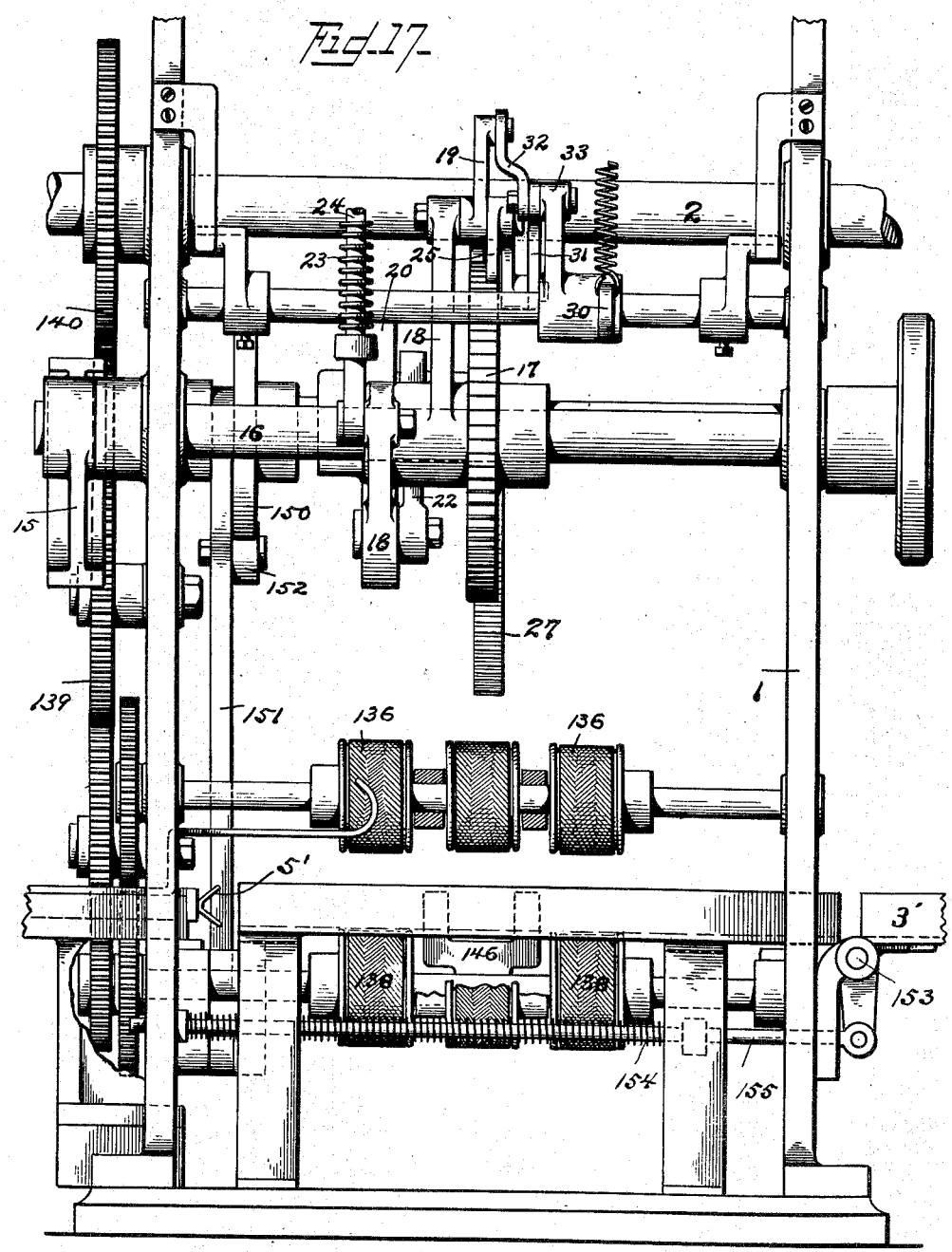

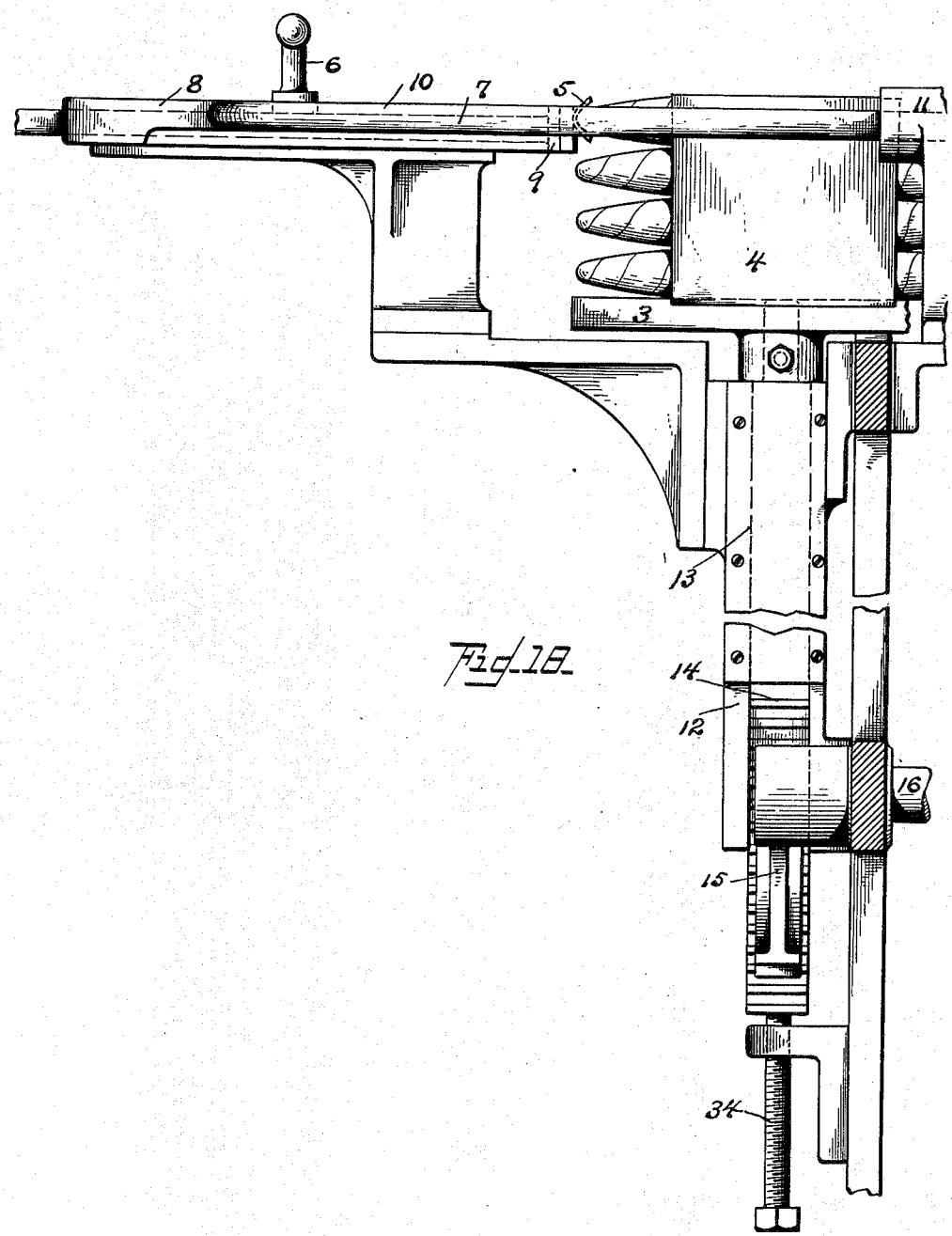

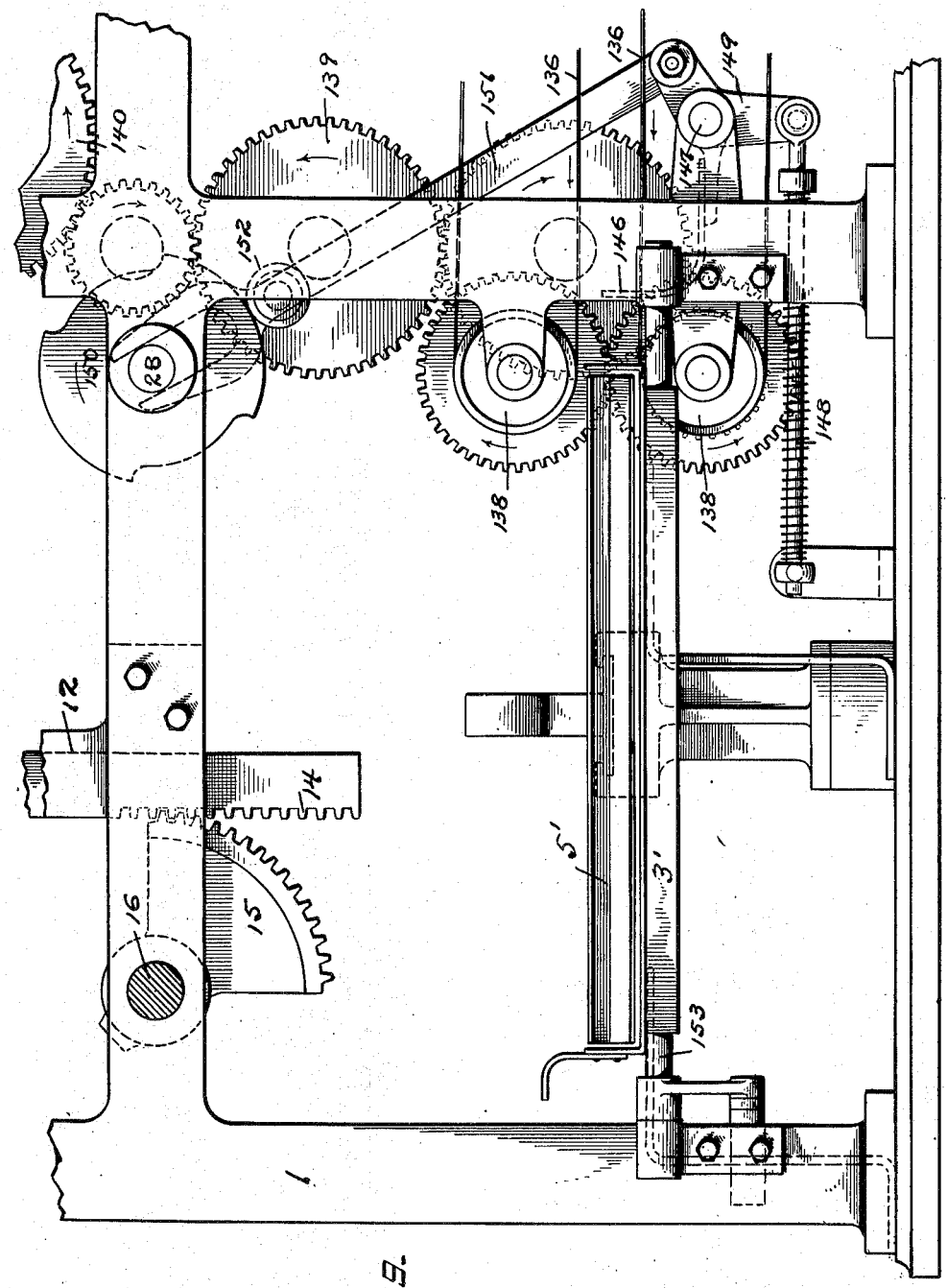

UNITED STATES PATENT OFFICE.

EDWARD P. SHELDON, OF BROOKLYN, NEW YORK.

MACHINE FOR BANDING CIGARS.

981,017. Specification of Letters Patent. Patented Jan. 10, 1911.

Application filed June 6, 1908. Serial No. 437,041.

*To all whom it may concern:*

Be it known that I, EDWARD P. SHELDON, a citizen of the United States, and a resident of Brooklyn, in the county of Kings and State of New York, have invented certain new and useful Improvements in Machines for Banding Cigars, of which the following is a specification.

My invention relates to machines designed to apply ornamental or other bands to cigars or other objects and its purpose, generally speaking, is to provide a simple, rapid and efficient means whereby cigars supplied to the machine in layers, taken from a stack or pile, may be furnished with a band and delivered from the machine in rows or layers for return to the box in which they were packed.

Machines have heretofore been constructed for banding cigars in their green state or before packing them in the boxes of the usual type and form, but no successful machine has heretofore been made by which the cigars after being packed and allowed to dry in the box may be banded and restored to the box in the same relative positions as to layers and individual members of layers that they occupied when taken from the box. In banding cigars of the grade usually packed in boxes it has heretofore been the practice to band them entirely by hand.

My invention consists in the improved combinations of devices and the details of construction comprised in the machine shown in the accompanying drawings and hereinafter described, which machine, generally speaking, embodies the following mechanisms and groups of mechanisms or devices: (*a*) A platform for holding one or more rows or layers of the cigars and suitable means for transferring a row or layer to (*b*) a suitable conveyer, comprising, by preference, two members or elements, one of which runs continuously and receives the layer of cigars directly from the platform and the other an intermittently acting conveyer which feeds the cigars one at a time to position upon (*c*) a suitable collapsible support where it will be in position over the band fed on to a swinging or collapsible plate beneath the cigar by means of (*d*) mechanism for feeding the bands singly to position beneath the cigar from a series or pile thereof mounted on a suitable holder; (*e*) means for forcing the cigar past the collapsible support and carrying the band with it and through a guide or wrapping device for partially wrapping the band around the cigar and for delivering the cigar thus partially wrapped to position in one of a series of pockets in (*f*) an intermittently operated conveyer comprising, preferably, a pocket wheel whereby the cigars are transferred to a delivery or exit conveyer; (*g*) means for gumming and folding down the ends of the bands preferably after their delivery to a pocket of the wheel and in the operation of moving the pocket wheel forward to present a new pocket; (*h*) a conveyer for receiving the cigars after they have been retained in the pocket wheel a sufficient time to allow the gum to dry and delivering them in a layer upon (*i*) a suitable delivery table from which they may be transferred in a layer to and repacked in a box; (*j*) means for operating the various parts intermittently or continuously and coördinating their functions as will be hereinafter more particularly described, all said mechanisms being, by preference, operated from the same main or master shaft or from counter shafts driven thereby.

The invention consists in the combinations of the various co-acting devices above enumerated with their immediately associated elements and in the whole combination constituting the complete machine and also in the details of construction of the various devices or elements enumerated.

Figure 2:
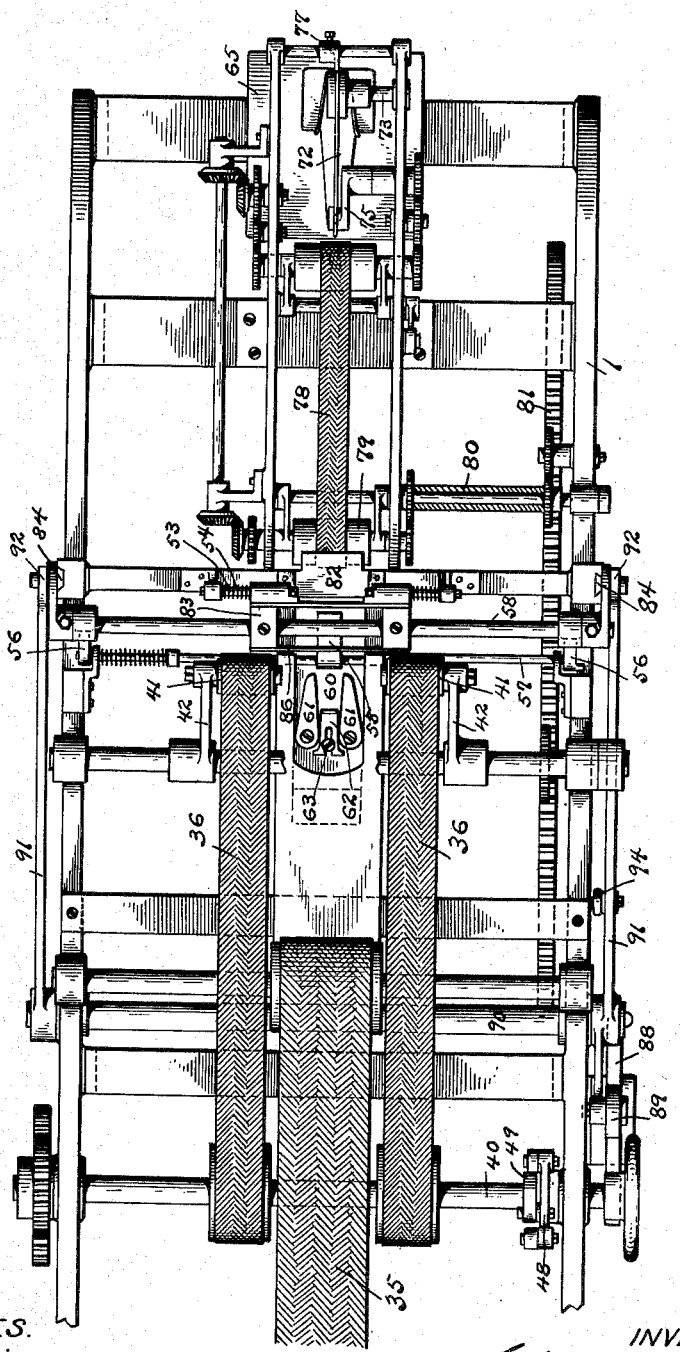
Figure 3:
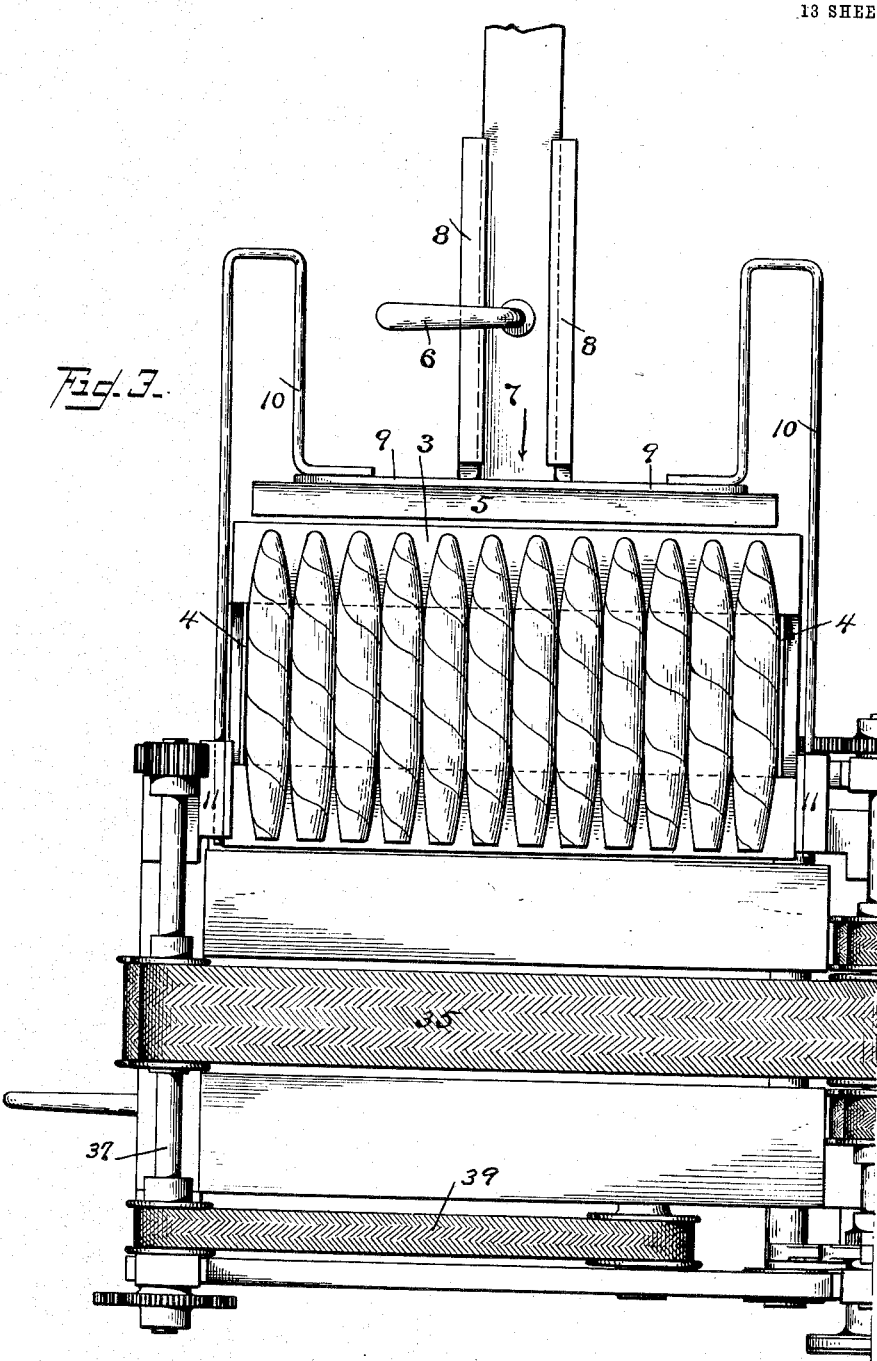

In the accompanying drawings, Figure 1 shows a side elevation of a machine constructed according to my invention. Fig. 2 is a plan view of the right hand end of the machine. Fig. 3 is a plan view of the left hand end of the machine. Fig. 4 is a side elevation of the left hand end of the machine. Fig. 5 is an enlarged side elevation of a portion of the right hand end of the machine. Fig. 6 is a longitudinal vertical section of Fig. 5. Fig. 7 is an end elevation taken from the right of the machine. Fig. 8 is a detail view of the band or label elevator devices. Fig. 9 is a plan view of the machine taken from the pocket wheel. Fig. 10 is an enlarged side elevation and partial section of the device for transferring the cigar after being placed in position over the wrapper to the pocket wheel. Fig. 11 is a plan of the gumming and folding devices. Fig. 12 is a plan partly in section of a portion of Fig. 11. Fig. 13 is a side elevation of the same in retracted position. Fig. 14 shows the same moved forward to fold down one of the free ends of the band. Fig. 15 shows the position of the parts at the completion of the folding operation. Fig. 16 is a detail view of the pocket wheel operating means taken from the side of the machine. Fig. 17 is an end elevation of the machine taken from the left, a portion being removed. Fig. 18 is an end elevation of the removed portion. Fig. 19 is an enlarged side elevation of a portion of the left-hand end of the machine.

1 is the main frame of the machine and having various shafts and other devices suitably mounted upon it in the required relative positions.

2 is the main or master shaft driven from any suitable power and imparting motion of the required kind to the various devices by means of cams, gears, countershafts and actuating pawls in suitable ways, as for instance in the ways more particularly hereinafter described.

3 is a platform which receives the cigars and from which they are transferred to the conveyer whereby they are carried to position for banding. A layer of cigars in position for transfer to the conveyer is shown in Fig. 3.

As my machine is intended especially for use in banding cigars after being packed and allowed to dry in boxes, I provide means for supporting all the cigars in a box in position on the platform and in a stack in which they will retain the relative position which they occupied in the box and also I provide a vertical movement of the platform whereby successive layers may be brought into proper position for transfer to the conveyer. As well known, boxes usually contain 25 cigars packed in two rows or layers containing either 12 and 13 cigars respectively or 50 cigars packed in four rows of 12, 13, 12 and 13 respectively.

In order that the cigars may be transferred from the box to the table and disposed on the latter in a stack without disturbing their relation to one another, it is preferable to provide a detachable tray 4, preferably, of thin sheet metal and which is adapted to set in an opening in the surface of the platform 3 flush with said surface. This tray has a bottom and two ends projecting upward at right angles therefrom but is open at its sides and top, thereby adapting it to be inverted and inserted into a box of cigars by passing the elevated ends between the cigars and ends of the box and bringing the bottom down upon the top layer of cigars. By then turning the box up side down and removing it, the cigars will be left in the tray in a stack without disturbing their relative positions and the bottom layer of the box will obviously be the top layer of the stack. When the tray is placed upon the platform 3 and the latter is lowered to the proper position, the top layer of the stack which was the bottom layer of the box can be transferred as a layer to the conveyer by the operation of a pusher 5 adapted to engage the horizontal layer and moving in the direction of the arrow, Fig. 3, by means of a handle 6 secured to the stem 7, which stem works in suitable guides 8 and carries the pusher 5 at its forward end. After this transfer operation the pusher is moved back and the platform moved up to bring the next layer into position for engagement by the pusher. This movement of the platform may be brought about by mechanism to be presently described and acting to bring the next layer into position by the time that the previously transferred layer has been moved forward out of the way.

Extending forward from a plate 9, carrying the pusher, are two fingers 10 working through guides 11 and disposed at opposite sides of the layer of cigars with their forward ends extending slightly beyond the forward ends of the cigars as shown in Fig. 3. These forward ends are rounded so as to adapt them to enter between the upper and lower bands or tapes of a tape conveyer which receives the layer of cigars and to thereby spread said bands and thereby permit the cigars to be transferred to position in the conveyer without injury. This transfer apparatus is suitably mounted upon a bracket 12, as better shown in Fig. 18 and the table 3 is carried by a vertically depending stem or rod working in guides 13 and provided with a rack 14, operated by a sector 15 to raise and lower the table. The sector 15 is carried on a rock shaft 16 mounted in the frame of the machine. The shaft is rotated to raise the platform and bring a second layer into position for transferring to the tape conveyer.

For actuating a ratchet wheel 17 secured to the shaft 16, I employ the following means:—18 is a rocking arm loose on shaft 16 and carrying at one end a pawl 19 pivoted thereon. Said pawl is moved intermittently to turn the wheel the distance of one or more teeth by the operation of a cam 20 operating upon cam roller 21 carried by a rod 22, which is coupled to the rocker arm 18. The connection of the rod 22 with the rocker arm 18 is through a pin capable of adjustment in a slot in the arm and of being set to any desired point on a radial line extending from the axis of rotation of said arm and of being fixed in the adjusted position, thereby determining the number of teeth that shall be taken at each step of the wheel 17 when the arm is retracted by the action of a spring 23. Spring 23 operates on a rod 24 secured to an arm projecting from the rocker arm 18 or from the hub thereof and is put under compression by the action of the cam 20 when the rocker is moved to carry the pawl 19 backward over the teeth of the wheel 17. The purpose of the adjustment of the connection to vary the throw of the rocker arm by the action of the cam is to provide for cigars of different thickness, it being obvious that the smaller the cigars the less the vertical movement required of the table in order to bring a new layer into position for transfer to the conveyer. A finer adjustment of the movement that will be produced for each movement of the rocker arm is provided by attaching to said arm a second pawl 25, which, when adjusted for action upon the wheel, will act thereon a fraction of a tooth ahead of the pawl 19 and thereby permit the wheel to be moved at each operation of the arm a distance equal to a number of whole teeth, plus a fraction of a tooth, if desired. When the pawl 25 is not required to act, it may be held out of position for engaging the teeth of the wheel by means of a set screw 26 acting on a tail piece extending from the pawl and itself carried on a support fixed on pawl 19 or on the arm 18. The cam 20 is driven from the main shaft 2 by means of a pinion on said shaft geared to a wheel 27 fixed on the cam shaft 28. A pair of retaining pawls for the wheel 17 is shown at 29. When it is desired to lower the table to position for receiving a fresh stack of cigars, said retaining pawls may be lifted out of engagement with the wheels 17 by means of an arm or lever 30 which acts also to lift the actuating pawls 25 and 19 out of engagement with the same wheels through the intervention of links 31, 32, pivotally connected to an arm 33 on the shaft carrying the operating lever 30.

An adjustable stop 34, (Fig. 18) is provided for limiting the downward movement of the platform and thereby bringing the same to rest in proper position such that the top layer of the stack on the platform will be properly disposed with regard to the pusher and the conveyer. Obviously, in the case of a 25 cigar stack the stop should be adjusted upward so that the platform will not be allowed to descend more than approximately one-half the distance that it does when a 50 cigar stack is to be placed on the platform.

The conveyer which feeds the cigars to position for banding may have for its continuously operating portion two tapes 35, 35' adapted to grasp the cigars by their middle and feed the same into the space between two pairs of intermittently operating tapes 36, 36' adapted to take hold of cigars at opposite sides of the middle portion so as to leave the said middle portion free for application of the band. One pair of the latter tapes is indicated at 36 and the other pair at 36'.

The tapes 35, 35' run at their rear portion over drums upon shafts 37 which are geared together and which receive motion by a band drive operated from wheel 27 or other continuously revolving member of the machine. Said wheel 27 gears to a wheel on shaft 38 carrying a pulley for the band 39 which runs over a band wheel on one of the shafts 37. The forward ends of the two tapes 35, 35' run, if desired, over loose pulleys on shafts for the intermittent drive tapes or on separate shafts, if desired, but their forward portions should be in such position as to deliver the cigars continuously into the intermittent tape drive composed of the two pairs of tapes 36, 36'. The continuously running tapes are run at somewhat higher speed than the tapes 36, 36' to insure a constant supply to the latter and the presentation of a new cigar to the banding appliance at every step forward of the tapes 36, 36'. At their rear end where the tapes overlap, the tapes 36, 36' pass over drive pulleys carried by shafts 40, the lower one of which may be driven intermittently as will be presently described, and may be geared to the upper one through a suitable gear as represented. The forward ends of the tapes 36 are carried over pulleys 41 mounted on forwardly projecting arms 42 and the lower pair of tapes is carried similarly over pulleys set in position to permit the tapes to deliver the cigars one at a time to a pair of collapsible supports upon which they are temporarily supported in position over the band just prior to being forced down upon the band, and then carried along, with the band partially enwrapping it, to the devices by which the banding is completed before it is carried away by the pocket wheel.

The mechanism for giving the forward step by step motion to the tapes 36, 36' may be driven direct from the main shaft 2 and may be constructed as shown in detail, Fig. 16. 43 is a shaft carrying a gear meshing with a gear 44 on the main shaft 2 and 45 is a cam disk on shaft 43 having projections adapted to engage the roller mounted on a lever 46. The latter is connected by a link 47 with a pawl carrying arm 48, loosely mounted on the shaft 40 which carries the drum for the rear end of the lower tape 36'. The pawl carrying arm 48 is provided with a pawl operating on a ratchet disk 49 fixed to the shaft. The roller is kept in engagement with the cam disk 45 and the pawl is retracted to engage a fresh tooth of the ratchet 49 by means of a spring 50 acting on a rod 51 which is pivotally connected to a projection of the pawl carrying arm 48. Obviously, other means might be employed for giving an intermittent forward motion to the tapes 36, 36′ so as to convey cigars to a position for being banded and received by the pocket wheel. The collapsible support which receives the cigars one at a time from the conveyer tapes, 36, 36′, preferably consists of a pair of hinged or pivoted plates or supports 52 mounted to rock or turn on a shaft 53 and normally held in horizontal position to receive the cigars by a spring 54. These supports are collapsed or turned down to permit the cigar to pass down to the pocket wheel or conveyer either by pressure upon the upper side of the cigar by a plunger or by a positive action of a portion of said plunger on the plates themselves. Between the plates 52 is another collapsible plate or support 55 mounted on a lower horizontal line than the support the middle portion of the label fed on to the same by means to be presently described: This plate 55 may collapse or swing by the direct pressure of the cigar when forced down by the plunger acting on its upper side or its movement may be assisted by pins or fingers adapted in the downward movement of the plunger to engage the forwardly projecting arm 56 extending from the rock shaft 57 to which the plate 55 is secured. These downwardly projecting fingers or pins may be carried at the ends of the cross-rod or shaft 58 which reciprocates in a vertical line and supports the plunger, as will be presently described. The pins or fingers are indicated at 59, Fig. 7, and the arms extending from the rock shaft 57 are also shown in said figure. A support plate for that end of the label or band which is projected by the label or band feed devices across plate 55 is shown at 60. This plate has two side plates 61 tapered or conformed to properly engage the edges of the label and center the said free projected end. A stop 62 is engaged by the forward end of the label and may be adjusted and set by means of a screw fastening the plate 63 that carries the stop. The label or band feed may be constructed as follows and preferably comprises two elements, a reciprocating intermittently acting band feed for feeding the bands one at a time from a pile of bands, and a tape feed, preferably continuously acting which receives the bands one at a time and feeds them to position for banding.

65 is a table working in suitable guides 66 and adapted to carry a pile of bands 67. The table is raised by means of weight 68 connected to a cord passing over pulley 69 attached to the end of a downwardly projecting stem 70 depending from the table. By this means the pile of labels is pressed upward for engagement by the feed device which may comprise a pivoted and serrated or roughened block or plate 71 shown in Fig. 6 in its forward position where it will have completed its movement in transferring the top band or label of the pile on the table to a tape feed which carries the same over and places it upon the collapsible support 55 under the cigar.

The feed plate or block 71 has a horizontally slotted arm 72 by which it is hung loosely on a pin 73. A shaft 74, constantly revolving and receiving motion from the tape feed or other part, through suitable gears, carries a crank arm 75 having a laterally projecting pin 76 which enters a vertical slot in the serrated feed plate 71. As the shaft 74 revolves clockwise, the pin on the arm 75, by describing a circular path, first lifts the plate 71 from the position shown, (said plate turning in the meantime on the support pin 73) then swings the same backward and causes it to slide on pin 73, and finally on completion of a half revolution drops the plate onto the pile of bands at the rear end thereof and in position to feed the band forward as the crank arm 75 turns through its lower half revolution to the position shown in the drawing, Fig. 6.

A cutter knife 77, fixed on the frame, engages the upper portion of the pile of bands which are forced against it by the action of the weight and penetrates the upper band while its point enters the next band of the pile. The rear side of this cutter or point is sharpened so that, as the top band is fed forward, it slits the rear end of the band and frees the same for the forward movement, but retains the next band and prevents it from moving forward through the friction or locking together of the two upper bands due to friction or the nesting of the embossed marks or design upon the same.

The two tapes which receive the band and convey the same forward, finally depositing it upon the collapsible support, are shown at 78. They pass over pulleys or drums 79 which are driven from any suitable revolving member of the machine, as for instance, from wheel 81, geared to a spur wheel on one end of a revolving sleeve 80, the opposite end of which sleeve carries a spur wheel gearing to the shaft of one of the forward drums 79. Motion is transmitted to other members of this tape feed and to the serrated feed plate through any desired system of gearing, as for instance, pinions and bevel gear, as indicated better in the plan view, Fig. 2.

As this transmission gear may be indefinitely varied and will be understood from the drawings, it need not be described further in detail.

As the label passes from the feed tapes 78, it is received and forced through a pair of guide plates 82 properly mounted in the frame of the machine and having their mouth or opening at a proper elevation to guide the forward end of the label over the collapsible support or plate 55. Obviously, the rear edge of these two plates should be located well within the space between the two forward tape rolls 79 and as better shown in Figs. 9 and 10. The edge of the bottom plate may project slightly beyond the upper plate in a rearward direction to better adapt it to receive the label.

The device for forcing the cigars, when superimposed upon the label, down through a guide way to the pocket wheel, thereby partially infolding the cigar with the label may comprise a plunger 83 mounted on the cross bar 58 which is inturn, carried by the slides 84 vertically guided on the frame of the machine, as shown in Fig. 1. The plunger engages the top of the cigar when the latter is in position on the collapsible support 52, by the blocks 83 or other suitable part of said plunger. At the forward side of the plunger rises a plate 86 that acts as a stop against the entrance of another cigar when the plunger is depressed and at its rear side there is a depending plate 87 which acts as a stop for the cigar being fed into position and locates it in proper position over the passage way through which it is forced by the downward movement of said plunger. The rear plate 87 may also act upon the support plates 52 to assist in collapsing the same, and said rear plate, as shown in Fig. 7, is cut away at its center so as not to interfere with the free movement of the rear end of the label in being pushed down with the cigar by the action of the plunger.

Motion may be communicated to the plunger directly from the main shaft 2 by means of a cam 88 working against a roller 89 carried by a rock shaft 90 from the ends of which project arms 91 having at their extreme ends hooks 92 engaging the slides 84 through pins 93 carried by said slides, as better seen in Fig. 7. The projections on the cams serve to lower the plunger. The plunger is raised by the action of a spring or springs 94 applied to reciprocating rods which are pivotally connected to the operating arm or arms 91, as shown in Fig. 5.

A single cigar having been fed along and deposited upon the collapsible support, already described, so as to be directly in position over one of the pockets 95 in the pocket wheel and in position over the middle part of the band which has been previously fed onto its support, the plunger in its descent will carry the cigar down together with the band engaged by the middle portion of said cigar and the attached fingers on the plunger will move or swing the band support sustaining the band at its middle out of the way, so that there will be no friction thereon tending to displace it around the axis of the cigar. As the plunger moves down carrying the cigar and the band with it toward the pocket, the band becomes partially enwrapped around the cigar, its two free ends, however, projecting vertically upward as it passes down into the pocket 95 and rests upon a support plate 96. When it reaches this position, it lies between the two plates 97, 98, the former of which is a spring-actuated follower, which follows up the cigar as the pocket wheel moves forward and presses it against the opposite plate 98, which is a hinged plate, and carries an arm or extension 99, operating as a folder and presser to fold down the last free end of the label and press it down upon the gummed surface of the other end.

The folder or presser which first acts and folds down the previously gummed end of the label is indicated at 100. It is supported together with the gumming roller 101 upon the end of a bent arm 102 which receives motion in the manner to be presently described, causing it to swing from the position shown in Fig. 13, where it engages, at its rear side, upon a revolving gum-supply cylinder 103 forward to position shown in Fig. 14. The cylinder 103 revolves in a tray 104 supplied with the liquid gummy substance and is operated by any desired transmission gear connected to a revolving part of the machine. The arm 102 is swung intermittently to carry the gumming roller 101 and folder 100 forward and backward by a cam 107 fixed to a shaft 108 which is geared up to the main shaft 2. The projections on the cam 107 operate upon one end of a rocking arm 109, while the other end of said arm is connected by a link 110 with an arm 111 extending from a rock shaft 112 from which projects the arm 102 carrying the gumming device and folder and presser 100.

The follower 97 is a plate carried upon the forward end of a spring actuated and properly guided rod 113. It is retracted on backward movement of the arm 102 by means of an extension 102' from said arm, which extension has a fork straddling rod 113 and adapted to engage collar 113' on rod 113 as shown in Fig. 11 when the arm moves backward. As the arm moves forward, however, it frees the rod and follower and leaves them to be acted upon by the follower-actuating spring 114 which moves said follower and causes it to press against the cigar as the same is carried forward by the pocket wheel, and as will be presently described. In the first part of the forward movement of the arm 102, the gumming roller 101 comes into contact with and gums the outside of the left-hand free end of the band or label and then the presser or folder 100 engages said free end and finally folds it down upon the cigar in the position shown in Fig. 13, leaving the outside gummed portion exposed for contact by the other free end of the label. The carrier wheel or pocket wheel with the cigar is now moved forward and the cigar, by engaging the flap or plate 98 carrying the other folder 99, swings the same and carries the folder 99 rearwardly so as to fold down the remaining free end upon the gummed portion of the label, at which time the presser 100 will have partially receded through the rear movement of the arm 102. In the meantime, the cigar will be kept in position against the forward side of the pocket and will be carried along by the action of the follower which follows up the cigar as the pocket wheel moves forward. After the band has been gummed and folded around the cigar and the ends securely pressed down, the pocket wheel, revolving step by step, carries said cigar around to the lower part of the machine where it falls upon a curved incline 115, best shown in Fig. 1 and by which it is delivered to a conveyer and finally carried to the delivery table.

The pocket wheel and the means for operating the same step by step are preferably as follows:—The function of the pocket wheel is to hold or assist in holding the individual cigars while they are partially infolded by the band and while the latter are being gummed and fastened and then to convey them away to the action of the devices by which they are transferred to the delivery table or platform, the cigars being retained on the pocket wheel a sufficient time to permit the gum to set before they are further handled by the machinery. The pockets 95 are formed between projections carried, respectively, by members of the wheel adjustable circumferentially around the axis of rotation to vary the distance between the two projections 118 and 119 forming, respectively, the two sides of the pocket. As shown, in Fig. 7, the pocket wheel really is constructed to hold the cigar in two separate pockets embracing the said cigar near its ends and leaving its central portion free for the operating of the gumming and folding device. 116 is the shaft carrying the composite pocket wheel. Fastened to said shaft are the two wheels 117 carrying the projections 118, while within said wheels are two other wheels 120, preferably fastened together at their hub portions and carrying the projections 119. The wheel members 120 are secured together, as shown in Fig. 7, but are capable of rotation upon the hub of the two wheels 117 and of being fixed in any desired circumferential relation thereto by means of a screw 121 fixed to wheels 120 and working through a curved slot in the spoke of one of the wheels 117, as indicated in Fig. 6 or, if desired, a stud secured to one member and screw-threaded at its end may pass through a slot in the other and be provided with a nut 122 which will fasten the several members together and cause them to revolve as one when the nut 122, Fig. 5, is screwed down tight. By this means, the width of the pockets 95 may obviously be varied, since that width is determined by the distance between the projections 118 and 119. As the pocket wheel revolves step by step it carries the cigars around through approximately a half revolution of the wheel to the conveyer to be presently described. During this movement the cigars are retained in the pocket wheel by a curved incline or guide 115 which prevents the cigars from falling out of the pockets as they are carried along, and which terminates at its lower end in position to deliver the cigar to the traveling bands of a conveyer, said bands being two in number, one above the other, and being adapted to receive the cigar between them, as will be presently described.

The mechanism for producing the intermittent motion of the pocket wheel may be constructed and operated as follows:—(See Fig. 16.) Inasmuch as the said wheel is of considerable size and weight, so that its momentum would tend to carry it forward at each impulse beyond the position where it should stop, in order to properly receive the individual cigars, the said mechanism is preferably constructed with an automatic lock or stop adapted to free the wheel while it is receiving the impulse but to automatically engage and stop the forward motion of said wheel accurately at the proper point. 123 is an impulse pawl which operates on a wheel 124 secured to the shaft 116 carrying the pocket wheel and moves the same forward step by step. Pawl 123 is mounted on an arm 125 loose on shaft 116 and receives its motion from any desired rotating shaft having a cam formed to operate the pawl at proper intervals. Such a cam is shown at 127, Fig. 16. It may be mounted upon the main shaft 2 and transmit motion to the arm 125 and impulse pawl through a link 128 which carries a roller 126 that is engaged by the cam and which link is supported on the shaft 2 by a fork, as clearly shown. 129 is an ordinary spring-actuated retaining pawl engaging the teeth of wheel 124 and serving to prevent backward movement thereof. 130 is the locking dog or pawl which checks the forward motion of the wheel under the impulse and acquired momentum and stops it in the proper position. In order that said locking dog may free the wheel during the forward impulse by pawl 123 at each step or feed movement, it is provided with a stud or tooth 131 adapted to ride upon a curved arm 132 having at 133 a projection which, as it passes under the tooth 131, will raise the pawl 130 and free the wheel for an instant at the beginning of the impulse or just as the tooth of pawl 123 begins to act, and immediately after freeing the pawl 130, will allow it to drop back into engagement with the periphery of the wheel 124, so that it will lock the same, at the conclusion of the forward impulse by engaging a tooth of the wheel. The arm 132 carrying projection 133 is mounted upon or attached to the rocking arm 125, as shown so as to move with the pawl 123 and in the forward or impulse movement of the latter to free the wheel by lifting the lock pawl 130, as described, and then as the projection passes along with the forwardly moving pawl 123, it frees the lock pawl so that it may act at the proper instant. The reverse movement of the parts after being actuated by a projection of the cam 127 may be produced by a spring 134 acting on a rod coupled at 135 to the arm 125, as clearly shown in Fig. 16.

The conveyer which receives the cigars from the pocket wheel comprises, preferably, a pair of bands 136, carried at their portions nearest the pocket wheel by pulleys 137 and receiving motion at their portions traveling on pulleys 138 in any desired manner as, for instance, by a system of gears, parts of which are shown in Figs. 1 and 19 and which system receives motion from any desired shaft of the machine, as for instance, the main shaft 2. For this purpose, shaft 2 may be provided with gear wheel 140 operating through the system of gears 139 to turn the shaft carrying the lower pulley 138, the latter shaft being geared up to the shaft of the upon pulley 138 in obvious manner.

The pulleys which carry the portions of the conveyer bands 136 which receive the cigars from the pocket wheel are carried on arms 141 projecting horizontally forward from rock shafts 142, so that the said arms being fastened together the continuously moving bands may be moved down at the right moment to take the cigar out of the pocket wheel as it is moved forward to present the banded cigar to said conveyer bands. By this action of the conveyer bands in grasping and positively withdrawing the cigar from the pocket, the cigar is prevented from dropping from the pocket and turning over and is fed into and through the space between the delivery bands in the same position in which it is received by and carried along by the pocket wheel. The reciprocating movement at the receiving end of the delivery conveyer, which thus takes place, may be produced by turning one of the rock shafts 142, the rocking movement being imparted to an arm 143 secured to said shaft and receiving motion through a link 144 from a suitable cam 145. Said cam may take motion from a shaft carrying the pulley for one of the conveyer bands 136, as for instance, from the shaft carrying the lower pulley 138, which shaft is geared back to the cam-carrying shaft on which cam 145 is mounted. After receiving the cigar from the pocket wheel, the conveyer is raised by the action of a suitable spring 146 operating on one of the arms 141. The cigars received by the delivery conveyer from the pocket wheel are conveyed and delivered thereby to a suitable table from which they may be transferred to a tilting platform 3′ by means of another pusher 5′ or by other devices. By tilting the platform they may be slipped, one layer at a time into the box. Obviously that layer of cigars which was the lower layer in the box whose contents have been transferred to the tray and thence one layer at a time to the conveyer at the top of the machine will be the first layer to be received on the delivery platform 3′. The remaining layers will be received in succession but in reverse order to that in which they are packed in the box, so that obviously, as said layers are slipped one layer at a time from the platform 3′ into the box they will be repacked therein in the same order that they occupied before banding. Moreover, each individual cigar will occupy the same position which it had in the box in which it was packed.

In order that the cigars may be brought to the delivery platform 3′ in groups having 12 or 13 in each group, as required, to make the proper number for the successive layers, respectively, I provide a grouping or spacing device in the nature of a stop which temporarily stops the forward movement of the cigars as they are passed along by the delivery conveyer, thus causing them to be brought up close against one another, although they are spaced apart in being taken from the pocket wheel. When the proper number 12 or 13, as the case may be, has been assembled in the group this spacing or grouping device frees the group and the same is passed along as a layer to the platform 3′. As soon as the last one of the layer or group passes the position of the grouping or spacing device, the latter is moved again into position to detain the first cigar of the next layer and the succeeding cigars of that layer bunch up against the first one as they are fed forward by the flexible delivery bands, after which the grouping or spacing device is moved again to free the group as before. This grouping or spacing device comprises substantially a pair of fingers 146, as shown better in Figs. 19 and 17, which fingers are mounted upon arm extending from the rock shaft 147 and are adapted to be raised and lowered from position on opposite sides of the conveyer band for the purpose already stated. When raised to position in the figure, they temporarily hold the cigars from being fed out on to the delivery table. They are raised by the action of a spring 148 acting on arm 149 to rock shaft 147 and they are lowered by the action of a cam 150 which operates the rock shaft through a link 151. The link 151 is attached at one end to an arm extending from the rock shaft and at its other carries cam roller 152. At the latter end it is forked and engages and is guided by the shaft carrying the cam 150. The shaft supporting said cam may be the shaft 28, already described, or any other suitable shaft and may receive motion from main shaft 2, as already set forth. By proper conformation of the cam, it is obvious that the arms 146 may be timed in their action, so as to free a row of cigars after 13 have been accumulated and then after 12 have been accumulated in a compact row and so on.

The platform 3′ is mounted on a rock shaft 153 so as to be capable of swinging in a plane transverse to the line of feed of the cigars from the conveyer, and thereby causing the layer of cigars, after transfer to the platform, to slip therefrom into the box while held under the lip of the platform. A spring 154, operating on a rod 155, connected to the platform 3′ returns the same automatically to horizontal position where it may receive another layer from the table.

What I claim as my invention is:—

1. The combination of a platform adapted to receive a stack of cigars in layers and in the reverse order in which they are packed in a box, a conveyer, means for transferring the stack of cigars in successive layers to said conveyer, a banding mechanism, a delivery platform, and means for depositing the banded cigars in layers on said platform in the order of banding for retransfer in layers to the box.

2. The combination of banding mechanism, with converging devices adapted to receive a layer of cigars from a box, means for feeding said cigars in regular order to position for banding, a series of pockets, and means for feeding the same successively to position for receiving the banded cigars in succession, a conveyer for taking the cigars in succession from said pockets and a delivery platform upon which said conveyer deposits the cigars in a layer in the order of banding, as and for the purpose described.

3. The combination of banding mechanism, with converging devices adapted to receive a layer of cigars from a box, means for feeding said cigars, one at a time, and in regular order, to position for banding, a pocket conveyer and means for operating the same to bring its pockets successively to position for receiving the banded cigars, a delivery conveyer to which the cigars are fed, one at a time, from the pockets, a delivery platform, and means for spacing the cigars into groups containing, respectively, a number proper to constitute a layer in the box in which they are packed.

4. The combination, in a cigar banding apparatus, of a delivery platform adapted to hold a layer of banded cigars, banding mechanism for banding the cigars, one at a time, means for conveying the banded cigars to the platform in the order of banding, and intermediate devices for spacing the cigars into groups or layers.

5. The combination of a conveyer, means for supplying the cigars of a packed box to said conveyer in layers in the reverse order in which they are packed, banding mechanism to which the cigars are fed, one at a time, in regular order from the layer, a receiving platform adapted to receive the cigars in layers in the order in which they are banded, and means for conveying said cigars from the banding mechanism to said platform.

6. The combination of a continuously-operating conveyer adapted to receive a layer of cigars of a box, an intermittently-operated conveyer receiving the cigars from the first-named conveyer, a banding mechanism, means for feeding bands singly thereto in conjunction with cigars fed from the conveyer, a pocket conveyer into which the cigars and bands are transferred, one at a time, means for pressing down the ends of a band while in a pocket, means for transferring the cigars, one at a time, from said pockets, to a delivery platform, and means for spacing the train of cigars into groups, as and for the purpose described.

7. The combination of an intermittently-operated pocket wheel, means for feeding cigars in succession to position over a pocket in the wheel, a collapsible support onto which the cigars are fed, a band-supporting collapsible plate below said support, and a plunger for forcing the cigar down upon said plate.

8. The combination of the band supporting swinging plate, a collapsible support for a cigar, a plunger for carrying the cigar against the band and past the plate, and means connected to the plunger for operating the swinging plate positively.

9. The combination in a cigar banding apparatus of a platform adapted to support one or more layers of cigars, banding mechanism means for feeding the cigars of a row or layer, one at a time, to position for banding, and means for transferring cigars in a layer from said platform to said feeding means.

10. The combination in a cigar banding apparatus of a platform adapted to support two or more layers of cigars, banding mechanism, mechanism for feeding the cigars of a row or layer, one at a time, to position for banding, and coöperating mechanism for raising the platform to position to permit a second layer to be transferred to the feeding devices, as and for the purpose described.

11. The combination in a cigar banding apparatus of a platform for holding one or more rows or layers of cigars banding mechanism and a conveyer comprising two members or elements, one running continuously and adapted to receive a layer of cigars directly from the platform, and the other an intermittently acting conveyer adapted to feed the cigars one at a time to position for banding and receiving its cigars from the first-named member.

12. The combination in a cigar banding apparatus of banding mechanism a conveyer adapted to receive a row or layer of cigars, a platform provided with means for supporting a stack of cigars in superimposed layers, and a pusher for transferring the stack by layers to the conveyer.

13. The combination in a cigar banding apparatus of a platform provided with means for supporting a stack of cigars in superimposed layers in the reverse order in which they are packed, a conveyer, banding mechanism and means for transferring the stack in layers to the conveyer.

14. The combination in a cigar banding apparatus of banding mechanism a platform supporting a stack of cigars in layers, a pusher adapted to simultaneously engage the cigars forming a layer, and means for raising said platform, step by step, to bring successive layers into position for engagement by the pusher.

15. The combination in a cigar banding apparatus of banding mechanism the cigar-supporting platform and conveyer adapted to receive the cigars in layers from the platform, mechanism for raising the platform, and means for adjusting the rate of movement of said platform to the thickness of the individual cigars stacked thereon.

16. The combination in a cigar banding apparatus of banding mechanism the platform supporting a stack of cigars, mechanism for raising the platform, step by step, and means for varying the throw of the step by step actuating mechanism to compensate for differences in the thickness of cigars, as and for the purpose described.

17. The combination in a cigar banding apparatus of banding mechanism a vertically-movable platform adapted to support a stack of cigars in layers, a step by step feed mechanism having two impulse pawls one adapted to throw or move the impulse wheel a fraction of a tooth, and means for holding said pawl out of position for engaging the teeth of the wheel.

18. The combination in a cigar banding apparatus of banding mechanism the conveyer comprising a pair of tapes or bands adapted to receive a layer or row of objects between them, a pusher for transferring the row or layer to position between the tapes and separating or spreading fingers coöperating with the pusher, as and for the purpose described.

19. The combination in a cigar banding apparatus of banding mechanism a pair of feed bands adapted to hold a layer of cigars, a pusher and separating fingers carried by the pusher and adapted to enter the space between the pair of feed bands.

20. The combination of a pocket wheel adapted to receive banded cigars individually, a banding mechanism, means for transferring or delivering the cigars one by one, to the banding mechanism, in an order reverse to that in which they are disposed when packed in a box, and means for receiving the cigars, one at a time, from the pocket wheel and transferring them to a platform in groups comprising, respectively, the cigars of different layers for re-transfer to the box in layers whose order is the same as that in which they were originally packed.

21. The combination in a cigar banding apparatus of banding mechanism the vertically-movable platform and a detachable tray having a bottom and two ends adapted to be inverted and inserted into a box of cigars, as and for the purpose described.

22. The combination of a cigar receiving collapsible support comprising a pair of hinged or pivoted plates, a plunger adapted to engage the cigar while supported on the plates and carry the same downward, a band-supporting platform or plate, means for feeding bands singly onto said plate, and coöperating means for feeding the cigars one at a time into position on the said hinged or pivoted supporting plate.

23. The combination of collapsible cigar-supporting plates, a collapsible band-supporting plate, arranged in a vertical line between the same and a plunger adapted to carry the cigar downward past said plates.

24. The combination of a pair of collapsible cigar supports, means for feeding cigars intermittently onto the same, a band supporting plate or support located in a vertical line between the former supports and adapted to support the middle portion of the band temporarily and means for forcing the cigar downward past said plates carrying the band with it.

25. The combination of a collapsible support for the cigar, a plunger adapted to engage the upper side thereof, a collapsible band-supporting plate mounted on a rock shaft, and pins or fingers carried by the plunger for rocking said shaft.

26. The combination of the collapsible support adapted to support the middle of the label or band beneath the cigar and a support for the forward end of the label provided with side-guides for engagement by the edges of the label as the same is fed into position.

27. The combination of a pocket conveyer having pockets adapted to each hold a cigar, means for folding down one free end of a band upon the cigar while located in the pocket, a second folder adapted to engage the other free end as the conveyer moves forward, and a spring follower adapted to press against and follow up the band upon the cigar during such movement.

28. The combination of a pocket wheel, means for introducing a cigar superposed on and partially infolded by a band into a pocket, a gumming wheel and folder mounted to swing together on a suitable swinging support, means for operating the same to cause the wheel and folder to engage the free end of the band successively, and means for moving the wheel forward after such engagement and at the same time pressing down the other free end of the band.

29. The combination of the pocket conveyer adapted to hold the cigar partially infolded by the band with one end or flap of the band free and a folder carried by a flap or plate adapted to be engaged by the cigar as it is carried forward in the pocket so as to swing the folder and press the flap or free end down upon the previously gummed and folded opposite end of the band.

30. The combination of the pocket wheel or conveyer, means for inserting a cigar with a band partially wrapped around the same into said pocket, a gumming device and folder mounted on a swinging support for engaging one free end of the band while the cigar is at rest and supported in the pocket, and a swinging folder operated by the forward movement of the cigar in its pocket after the gumming operation for folding down the other free end of the band.

31. The combination of the pocket support, a swinging gumming and folding device for engaging the flap of the band partially wrapping the cigar while sustained in the pocket and while the support is at rest, and means for folding down the remaining free end upon the gummed portion of the band or label as the support moves forward with the cigar.

32. The combination of the pocket wheel or support having a free central portion and transversely arranged pockets adapted to sustain the cigar at opposite sides of the center and an intermediate support plate sustaining the band during the folding and pressing operation upon a flap or free end thereof.

33. The combination of the pocket wheel having a free central portion, means for forcing a cigar with a band partially infolding the same into position in the pocket, an intermediate support plate for the portion of the cigar receiving the band, and means for feeding the pocket wheel or conveyer forward to cause the cigar to be carried along and thereby actuate a folder or presser for a free end of the band.

34. The combination of the pocket wheel having a free central portion, an intermediate support plate between the two supporting portions of the pocket, a follower arranged to engage a side of the cigar while it is sustained in the pocket and on the support plate, and a swinging plate or flap adapted to be engaged by the opposite side of the cigar while thus located and carrying a folder or presser for folding down the free end of the band as the pocket with its cigar moves forward.

35. The combination in a cigar banding apparatus of banding mechanism the pocket wheel, a delivery conveyer consisting of a pair of bands and means for lowering the bands to cause them to take hold of and remove the cigar from the pocket.

36. The combination of means for temporarily supporting the cigar in position over the band, means for feeding the cigars one at a time to such position, a plunger for depressing the cigar on to the band, and stops carried by said plunger for preventing the entrance of a second cigar to position when the plunger is depressed and for locating the cigar when fed into position.

37. The combination of a pocket wheel conveyer, collapsible supports above the same for temporarily supporting the cigar and the band, means for feeding bands singly into position on their support beneath the cigar and a plunger for depressing the cigar and band past said support into the pocket.

38. The combination in a cigar banding apparatus of banding mechanism a pocket wheel, an intermittent tape feed for feeding cigars, one at a time, to position over a pocket, a continuous tape feed delivering cigars to the intermittent tape feed and a platform from which cigars may be delivered in layers from a stack or pile to the continuous tape feed.

39. The combination of the intermittently actuated pocket wheel and a swinging folder mounted to be engaged by the object carried in the pocket wheel, as the wheel moves forward.

40. The combination of the intermittently operated pocket wheel, means for inserting a cigar with a band partially infolding the same into the pocket, and a swinging folder for the forward up-turned end of the band adapted to be engaged by the partially banded portion of the cigar as the pocket wheel carries the same forward.

41. A combined band gummer and folder mounted on a swinging support to engage successively a free end of the band, an intermittently-actuated pocket wheel or conveyer adapted to support the banded objects, a follower for holding the band in position as the object moves forward, and means for folding down the free end of the band during such forward movement.

42. The combination in a cigar banding apparatus of banding mechanism a pocket conveyer adapted to carry banded cigars, a delivery table upon which a layer or row of cigars may be supported for re-transfer to a box, and an intermediate conveyer for receiving the cigars, one at a time, from the pocket conveyer.

43. The combination in a cigar banding apparatus of banding mechanism the delivery table or platform, the intermittently operated pocket wheel or conveyer carrying the banded cigars and the intermediate continuously operating conveyer for receiving the cigars from the pockets and delivering them as a row or layer to the delivery platform.

44. The combination of a conveyer provided with pockets, means for introducing cigars with bands wrapped around the same into the pockets of said conveyer one at a time, means for gumming and pressing down the free ends of the band upon the cigar in the pocket, a delivery table or platform, and means for delivering the banded cigars in a layer upon the platform for re-transfer as a layer to the box.

45. The combination in a cigar banding apparatus of banding mechanism a pocket wheel for receiving banded cigars, means for intermittently turning said wheel to bring the pockets in succession into proper relation to the banding and gumming appliances, a delivery platform adapted to hold a layer or row of cigars in proper relative position for transfer as a layer to a box and an intermediate continually operating feed device for feeding the cigars forward to the table as they leave the pockets of the wheel after the gum has set.

46. The combination of a collapsible cigar supporting plate, a band supporting plate adapted to support the middle portion of a band immediately beneath the cigar, a plunger for bringing the cigar down upon the band and means connected with the plunger for positively actuating said collapsible supports, as and for the purpose described.

47. The combination of the collapsible support for the cigar, a collapsible support for the middle portion of the band, a fixed plate or support for the forward free end of the band, and means for feeding the band endwise onto said supports.

48. The combination in a cigar banding apparatus of banding mechanism the continuously-operating conveyer adapted to receive a layer of cigars and to engage the same at their middle portion, and an intermittently-operated conveyer comprising a pair of tapes adapted to receive the cigar from the first-named conveyer and to grasp it outside the portion engaged by said first-named conveyer so as to carry the same forward to the band devices with its middle portion exposed for application of the band.

49. The combination in a cigar banding apparatus of banding mechanism the continually-operating conveyer adapted to carry a layer of cigars and an intermittently-operated conveyer taking the cigars from the former and operating at a less speed for conveying the cigars to the banding mechanism.

50. The combination with the cigar banding mechanism of a platform adapted to support a pile of bands, a feed block or plate for feeding the bands one at a time from said pile, a horizontally slotted arm and pin by which said block is hung and a revolving actuating pin connected to the block or plate through a vertical slot as and for the purpose described.

51. The combination with the cigar banding devices, of a serrated band feed plate, a pin and slot support therefor permitting a swinging and sliding movement of the plate and an actuating pin engaging and operating the plate through a vertical slot and means for operating said pin, as and for the purpose described.

52. The combination with the cigar banding devices, of a reciprocating band feed block or plate having a pin and slot support permitting a swinging and sliding movement, and an actuating rotating arm having a pin and slot connection with the plate, as and for the purpose described.

Signed at New York in the county of New York and State of New York this fourth day of June A. D. 1908.

EDWARD P. SHELDON.

Witnesses:
DAVID M. EDSALL,
LILLIAN BLOND.